(12) United States Patent
Potkonjak (10) Patent No.: US 8,112,649 B2
(45) Date of Patent: Feb. 7, 2012

(54) ENERGY OPTIMIZATION THROUGH INTENTIONAL ERRORS

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 492 days.

(21) Appl. No.: 12/405,607

(22) Filed: Mar. 17, 2009

(65) Prior Publication Data

US 2010/0241892 A1  Sep. 23, 2010

(51) Int. Cl.
*G06F 1/26* (2006.01)

(52) U.S. Cl. ........ 713/320; 370/252; 370/311; 455/574; 714/100

(58) Field of Classification Search .................. 714/100; 713/320–324, 330; 370/252, 311; 455/574
See application file for complete search history.

(56) References Cited

U.S. PATENT DOCUMENTS

| | | | |
|---|---|---|---|
| 6,131,166 A * | 10/2000 | Wong-Insley | 713/300 |
| 6,209,112 B1 * | 3/2001 | Stevenson | 714/752 |
| 6,838,331 B2 * | 1/2005 | Klein | 438/238 |
| 6,990,624 B2 * | 1/2006 | Dohmen et al. | 714/785 |
| 7,007,225 B2 * | 2/2006 | Chang | 714/774 |
| 7,406,342 B2 * | 7/2008 | Kim | 455/574 |
| 7,617,437 B2 * | 11/2009 | Moyer | 714/763 |
| 7,689,814 B2 * | 3/2010 | Okawa | 712/227 |
| 7,840,876 B2 * | 11/2010 | Sturm et al. | 714/766 |
| 2007/0067656 A1 * | 3/2007 | Ranganathan et al. | 713/320 |
| 2008/0108397 A1 * | 5/2008 | Piipponen et al. | 455/574 |
| 2009/0252054 A1 * | 10/2009 | Barkan et al. | 370/252 |

OTHER PUBLICATIONS

Narkhede et al. Adaptive Modulation and Error Control for Energy Efficiency for Wireless Smart Card. Syracuse University. 2003.*
Zaho et al. Exploring Performance-Power Tradeoffs in Providing Reliability for NoC-Based MPSoCs. The Pennsylvania State University. IEEE 12th International Symposium on Quality Electronic Design. 2011.*
Miller et al. Flexible Error Protection for Energy Efficient Reliable Architectures. The Ohio State University. IEEE 2010 22nd International Symposium on Computer Architecture and High Performance Computing. 2010.*
Das et al., "A Self-Tuning DVS Processor Using Delay-Error Detection and Correction", Apr. 2006, IEEE Journal of Solid-State Circuits, 41(4):792-804.
Ercegovac et al., "Low-Power Behavioral Synthesis Optimization Using Multiple Precision Arithmetic", 1999 , Proceedings of DAC'99, New Orleans, Louisiana, pp. 568-573.
Ernst et al., "Razor: A Low-Power Pipeline Based on Circuit-Level Timing Speculation", Jun. 6, 2003, MICRO-36, 23 pages.

(Continued)

*Primary Examiner* — Matthew Spittle
(74) *Attorney, Agent, or Firm* — Hope Baldauff Hartman, LLC (57) ABSTRACT

Technologies are described herein for intentionally allowing errors in a computational system to optimize energy consumption of the computational system. A cost-benefit analysis is performed to identify one or more allowable errors and one or more non-allowable errors in the computational system. The allowable errors may be identified by the cost-benefit analysis as being acceptable errors for optimizing energy consumption with respect to accuracy of the computational system. The non-allowable errors may be identified by the cost-benefit analysis as being unacceptable errors for optimizing energy consumption with respect to accuracy of the computational system. The computational system is transformed from a first state in which the computational system corrects or prevents the allowable errors and the non-allowable errors into a second state in which the computational system allows the allowable errors and corrects or prevents the non-allowable errors.

20 Claims, 5 Drawing Sheets

OTHER PUBLICATIONS

Memik et al., "Engineering Over-Clocking: Reliability-Performance Trade-Offs for High-Performance Register Files", 2005, International Conference on Dependable Systems and Networks (DSN'05), 10 pages.

Rabaey, et al., "Fast Prototyping of Datapath-Intensive Architectures", 1991, IEEE Design & Test of Computers, pp. 40-51.

Teodorescu, et al., "Mitigating Parameter Variation with Dynamic Fine-Grain Body Biasing", Dec. 2007, 40th International Symposium on Microarchitecture (MICRO), 13 pages.

Tiwari et al., "ReCycle: Pipeline Adaptation to Tolerate Process Variation", Jun. 9-13, 2007, ISCA '07, San Diego, California, 12 pages.

Venkatachalam et al., "Power Reduction Techniques for Microprocessor Systems", Sep. 2005, ACM Computing Surveys, 37(3):195-237.

* cited by examiner

ENERGY OPTIMIZATION THROUGH INTENTIONAL ERRORS

BACKGROUND

A variety of mobile and other devices utilize a significant amount of energy in order to operate. For example, mobile devices may perform energy intensive operations, such as high bandwidth wireless communications. Furthermore, adaptive architectural techniques, such as gating and reconfigurable devices incorporated into devices may also significantly consume energy.

Customer satisfaction with respect to mobile devices largely depends on the quality of service ("QoS") associated with the wireless communications. Customers often demand a certain level of QoS. Some service providers may even guarantee a level of QoS to certain customers. Thus, decreasing the amount of energy utilized by mobile multimedia devices at the expense of QoS may be undesirable. However, conventional energy consumption techniques typically do not account for QoS and may unknowingly and negatively reduce QoS.

The present disclosure addresses these and other considerations.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The following disclosure is drawn, inter alia, to methods, apparatus, systems and computer program products related to technologies for intentionally allowing errors in at least a small subset of results during the design, implementation, analysis, and/or operation of computational systems. Through the utilization of the technologies and concepts presented herein, the intentional allowance of errors may facilitate energy optimization in the computational systems.

According to some embodiments, a determination is made whether to allow an error by performing a cost-benefit analysis based on allowing the error or correcting/preventing the error. As used herein, "allowing" an error refers to the intentionally permitting the occurrence of an error by not correcting or preventing the error in accordance with conventional error correction and error prevention techniques. A favorable cost-benefit analysis, where the benefit surpasses the cost above a given threshold, may render a determination to allow the error. In contrast, an unfavorable cost-benefit analysis, where the cost surpasses the benefit above a given threshold, may render a determination not to allow the error. Examples of benefits may include, but are not limited to, energy savings, operational flexibility, and improved resiliency against silicon manufacturing variability, and operational conditions variability. Examples of costs may include, but are not limited to, operational complexity, potentially lower QoS, and user/customer perceptions.

The technologies and concepts described herein may be implemented on a variety of devices including, but not limited to, programmable and dedicated systems, datapaths, finite state machines, memory structures, interconnects, power networks, and clock distribution circuitry. Further, the technologies and concepts described herein may augment conventional design operations (e.g., architectural synthesis, logic synthesis, physical design) as well as conventional implementation operations (e.g., gate sizing, integrated circuit mask design).

Figure 1:
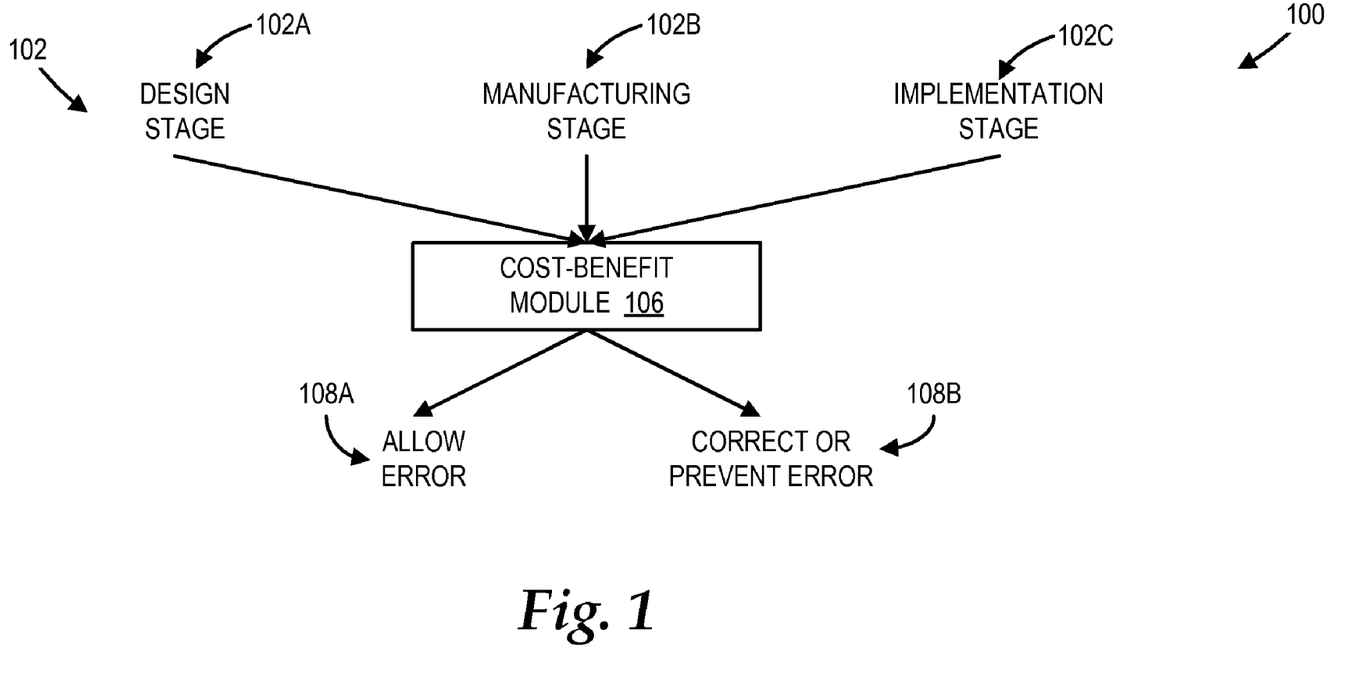
FIG. 1 is a diagram illustrating an implementation of a cost-benefit module within a life cycle of a computational system, in accordance with some embodiments of the present disclosure.

Referring now to the drawings, aspects of a computing system and methodology for minimizing energy consumption by intentionally allowed occasional errors will be described. FIG. 1 is a diagram illustrating an implementation of a cost-benefit module within a life cycle of a computational system, in accordance with some embodiments of the present disclosure. In particular, FIG. 1 illustrates a simplified operational flow 100 of a cost-benefit module 106. The cost-benefit module 106 may operate during any portion of the life cycle of a computational system. According to some example embodiments, the life cycle of a computational system includes a design stage 102A, a manufacturing stage 102B, and an implementation stage 102C (collectively referred to as "stages 102"). It should be appreciated that the categorization of a life cycle of a computational system in the shown stages 102 is merely illustrative and that the life cycle of the computational system may be represented in various other ways as contemplated by those skilled in the art.

According to embodiments, the design stage 102A may include all suitable phases of computational system design. The design stage 102A may refer to the selection and configuration of design operations regarding the computational system, as well as various components and sub-components within the computational system. For example, the design stage 102A may refer to electronic design automation ("EDA") operations, such as placement and routing with respect to the design of integrated circuits. The manufacturing stage 102B may include all suitable phases of computational system manufacture. The manufacturing stage 102B may refer to the selection and configuration of manufacturing operations regarding the overall computational system, as well as various components and sub-components within the computational system.

The implementation stage 102C may include all suitable phases of computational system implementation. In particular, the implementation stage 102C may refer to the selection and configuration of implementation operations regarding the overall computational system, as well as components and sub-components within the computational system. With reference to the previous example described in the design stage 102A, the manufacturing stage 102B may refer to the manufacture of the integrated circuits designed in the design stage 102A, and the implementation stage 102C may refer to the implementation of the integrated circuits designed in the design stage 102A and manufactured in the manufacturing stage 102B. For the sake of simplicity, any reference herein to a "computational system" may refer to the computational system as a whole and/or components and sub-components within the computational system.

The design stage 102A, the manufacturing stage 102B, and the implementation stage 102C may refer to the design, manufacture, and implementation, respectively, of general purpose processors, application-specific processors (e.g., digital signal processors ("DSPs"), microcontrollers, graphics processors, network processors, etc.), application specific integrated circuits ("ASICs"), field programmable gate arrays ("FGPAs"), and the like. As shown in FIG. 1, the cost-benefit module 106 may be implemented in any combination of the design stage 102A, the manufacturing stage 102B, and/or the implementation stage 102C.

According to embodiments, the cost-benefit module 106 may perform various cost-benefit analyses during one or more of the stages 102 in order to make a determination whether to allow an error at 108A or to correct or prevent the error at 108B. The cost-benefit module 106 can be configured to balance respective goals of minimizing the impact of errors (i.e., costs), while maximizing energy savings resulting from allowing the errors (i.e., benefits). In some instances, the decision to allow the error at 108A may be due to the relatively low impact of the error on a design, manufacture, or implementation of the computational system. In other instances, the decision to allow the error at 108A may be due to alterations of the design, manufacture, or implementation of the computational system. These alterations may reduce the impact of the error. The impact of errors may be determined by predictive methods and/or actual testing during one or more of the stages 102. Examples of impacts include, but are not limited to, temperature of the computational system, voltage variation of the computational system, and soft radiation error rate of the computational system. The cost-benefit module 106 is described in greater detail below with respect to FIG. 2.

Figure 2:
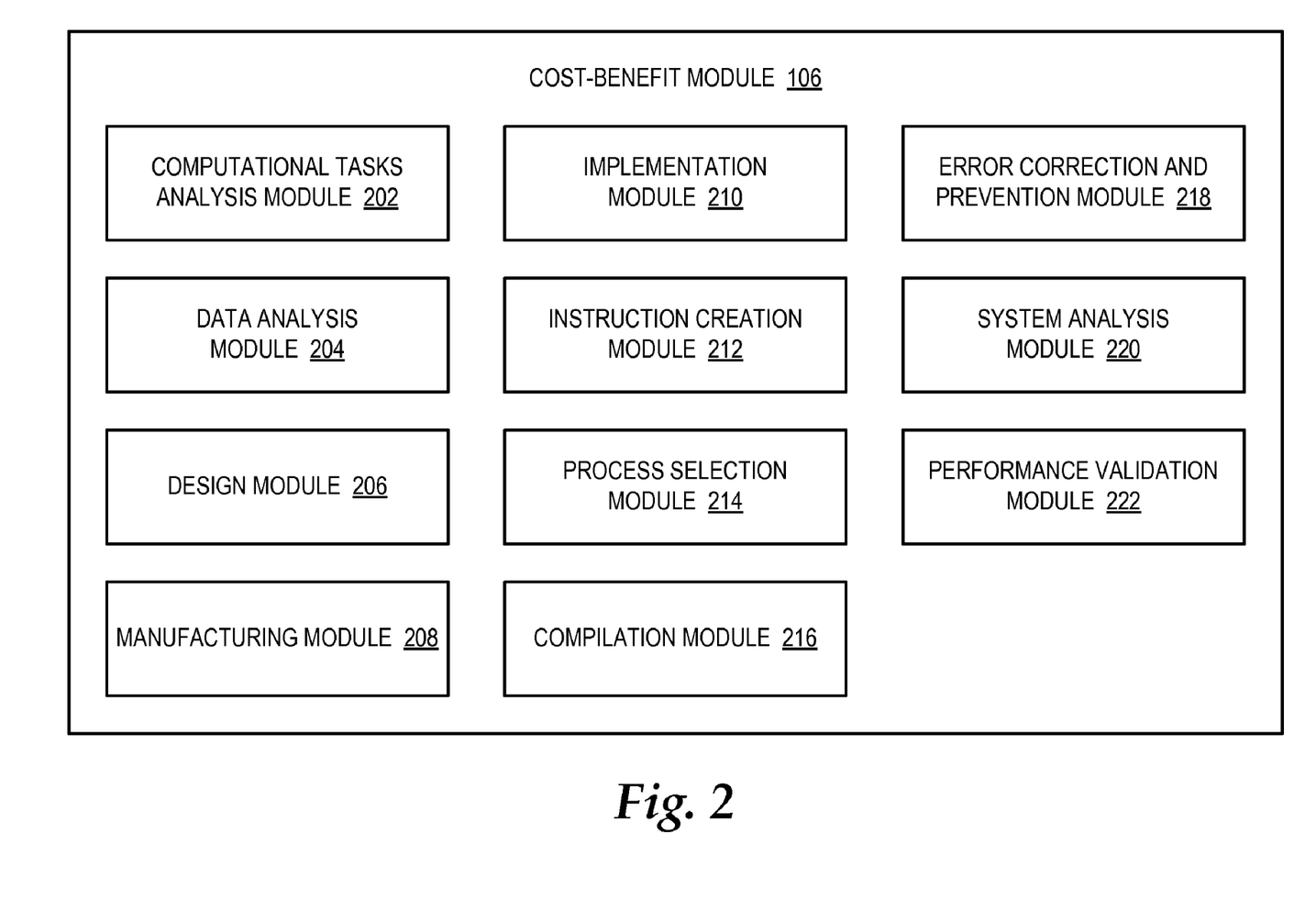
FIG. 2 is a block diagram illustrating an implementation of the cost-benefit module, in accordance with some embodiments of the present disclosure.

FIG. 2 is a block diagram illustrating an implementation of the cost-benefit module, in accordance with some embodiments of the present disclosure. As illustrated in FIG. 2, the cost-benefit module 106 may include one or more of a computational tasks analysis module 202, a data analysis module 204, a design module 206, a manufacturing module 208, an implementation module 210, an instruction creation module 212, a process selection module 214, a compilation module 216, an error correction and prevention module 218, a system analysis module 220, and a performance validation module 222. For purposes of illustration, the modules 202-222 are shown as being concurrently implemented within the cost-benefit module 106. However, it should be appreciated that the cost-benefit module 106 may be implemented with any combination of one or more of the modules 202-222. It should further be appreciated that the modules 202-222 are not intended to be mutually exclusive. The modules 202-222 may be implemented in hardware, firmware, software, or combinations thereof.

According to some presently disclosed embodiments, the computational tasks analysis module 202 can be configured to analyze a computer program to determine (1) operations performed when the computational system executes the computer program, (2) errors in the operations, and (3) how the errors impact the operations. For example, the computational tasks analysis module 202 may determine that an integrated circuit has a multiplier that does not work for larger input values. In light of this determination, the integrated circuit can be designed and/or implemented such that either no multiplication or multiplication with smaller input values is performed. In this way, the integrated circuit can be designed and/or implemented without the need for any corrections with regard to the multiplier.

A smaller input value may refer to a value in which its binary representation has a certain number of leading zeros. The threshold number of leading zeroes to identify a smaller input value may vary depending on a particular implementation. A larger input value may refer to any input value that has fewer leading zeros when compared with a smaller input value. In one example, a binary value of "0000 0101" may be considered a smaller input value (i.e., about 5 leading zeros), while a binary value of "0110 0000" may be considered a larger input value (i.e., less than 5 leasing zeros). Other examples are also contemplated where a fewer or a greater number of leading zeros can be used to connote a larger or smaller value.

The computational tasks analysis module 202 may conduct a variety of different analyses including, but not limited to, symbolic analysis, interval analysis, simulation, statistical analysis, and simulation with statistical analysis. Symbolic analysis can refer to analyzing operations in a process that are actually executed, and under the conditions which these operations are executed. For example, due to conditional statements (e.g., if-then-else statements), some operations may be executed only when inputs have certain values. Interval analysis simulation can refer to the situation where the output of a first operation becomes input into a second operation. In particular, interval analysis simulation analyzes how an error that is introduced into the first operation impacts the second operation. In some embodiments, interval analysis simulation is designed to output the worst-case or near worst-case result by overestimating or at least not underestimating any negative impact of the error.

Simulation refers to applying a set of representative inputs and observing any errors resulting from the representative inputs. By simulating a suitable set of inputs, a determination can be made when corrections are needed based on particular kinds of inputs. Statistical analysis refers to identifying computations likely to induce unacceptable errors. For example, long loops are often prone to inducing such unacceptable errors, especially when these long loops have divisions. Simulation with statistical analysis refers to conducting statistical analysis on the results of the simulation.

According to embodiments, the data analysis module 204 can be configured to analyze the behavior of a computer program when executed by the computational system based on a given set of inputs. For example, consider a computation that includes a single addition that is executed at each clock cycle, i, on a first input ($b_i$) and a second input ($c_i$). That is, at each clock cycle, i, $a=b_i+c_i$ is computed. Suppose that the addition is executed on a 16-bit adder, and the data analysis module 204 determines that the most significant bit is calculated incorrectly so that it is constantly a zero value. If the first input ($b_i$) and second input ($c_i$) for each clock cycle, i, use less than 15 significant bits, then no corrections are needed. However, if the first input ($b_i$) and the second input ($c_i$) are 15 or 16-bit numbers, then the result of the 16-bit adder may need to be corrected. When the first input ($b_i$) and the second input ($c_i$) are 15 or 16-bit numbers, the data analysis module 204 may monitor the two most significant bits of the result and issue a correction, as necessary, when the most significant bit needs to be changed from a zero to a one.

It should be appreciated that the computational tasks analysis module 202 and the data analysis module 204 may be implemented in computer aided drafting ("CAD") design tools utilized during the design stage 102A. The resulting data generated by the computational tasks analysis module 202 and the data analysis module 204 may be provided to other modules, such as the design module 206, the manufacturing module 208, the implementation module 210, and the compilation module 216. The results of the computational tasks analysis module 202 and the data analysis module 204 may also provide guidance to the compilation module 216 for optimizing computer program compilation.

According to embodiments, the design module 206 selects and configures design operations based on a cost-benefit analysis considering quantitative tradeoffs between accuracy (e.g., error rate, impact on QoS) and energy consumption when one or more design errors are allowed. For example, the design module 206 may select and configure design operations for designing the computational system in a way that enables the computational system to allow certain errors, such as those errors that are considered to have a limited impact on QoS.

The design module 206 may utilize a variety of testing and analysis methodologies to determine the relevant benefits and costs associated with allowing an error during the design stage 102A. In some embodiments, the design module 206 performs architectural synthesis techniques that include the design and use of functional units and memory elements that experience a diverse variety of errors under different conditions. For example, the design module 206 may enable the design of chained units that have relatively low probabilities for rare input combinations. In particular, as the number of inputs in a functional unit increases, the likelihood decreases that long combinational paths become sensitized.

A functional unit may be a hardware module that is configured to execute a logical or an arithmetic operation. Non-limiting examples of functional units may include one or more of an adder, a subtractor, a comparator, a multiplier, a divider, an accumulator, an arithmetic logic unit, or any reasonable combination thereof. A functional unit may be configured to read data from one or more registers and write the result into one or more registers. If two or more functional units are coupled together in such a way that the output of one is an input of another and there is no register placed between the two or more functional units, then the functional units may be considered to be "chained". For example, a multiplier-accumulator ("MAC") can be implemented as a chained unit where a multiplier is configured in cooperation with an adder so that the multiplier sends its results to the adder within a single clock cycle.

In another embodiment, the design module 206 performs behavioral synthesis optimizations and other high level synthesis operations. For example, the design module 206 may consider program transformations that impact word-length requirements and numerical stability. Further, the design module 206 may utilize various heuristic and statistical techniques in order to guide which program transformations to apply, where the program transforms are applied, and in what order the program transformations are applied. Other suitable behavioral synthesis optimizations include, but are not limited to, partitioning, module selection, operation chaining, and clock cycle time selection.

In another embodiment, the design module 206 enables the design of functional units that may have gated error detection and correction logic. Error detection logic is a logic block that is configured to detect errors, while error correction logic is a logic block that is configured to correct errors. For example, if the addition of two positive numbers yields a negative number as a result, the error detection logic may check the most significant bit and detect the error when an improper sign change is detected from positive to negative. An example error correction logic may be an adder that consumes a greater amount of power, but yields a correct result in a relatively high percentage. If an error is detected by the error detection and correction logic, then the adder in the error correction logic may repeat the addition operation as necessary to obtain the correct result. The error detection and correction logic may be implemented as gated modules. In particular, the error detection and error correction functions may be disabled (i.e. gated off) when their use is not needed, or enabled (i.e., gated on) when their use is required.

Further, the functional units may be designed to include critical paths and $\epsilon$-critical (or epsilon-critical) paths that are exercised for a relatively small percentage of unlikely inputs and operational conditions. A critical path is a signal path between a signal input (e.g., the input of a flip-flop) from one primary circuit and a signal output (e.g., the output of a flip-flop) of another primary circuit. Ideally, there would be no delay between a change in the signal output from the first primary circuit and the arrival of the corresponding signal at the signal input at the second primary circuit. However, due to various non-ideal effects, a delay may occur in the signal path that can result in performance errors in the overall system (e.g., race conditions, failed setup and hold times, etc.). A time interval or time delay (commonly referred to as Tcp) may require that a signal that propagates along the critical path dictates a limit to the fastest rate at which the integrated circuits can be clocked so that all results are correct. An $\epsilon$-critical path is a path where a signal requires at least a (Tcp-$\epsilon$) time interval for propagation, where $\epsilon$ may be adjusted depending on implementation.

The design module 206 may enable the design of a clocking frequency in such a way that clocking related errors may be limited to a specified set of inputs. Statistical modeling may be used to recognize constraint validation and the likely causes of errors. Statistical modeling may be performed on a set of parameters that are extracted from a design as well as from representative inputs.

In some examples, statistical modeling may be conducted as follows. A large set of representative input data (e.g., audio or video files) may be collected. For these representative input data, the clock cycle time (i.e., the time it takes to execute a given number of clock cycles) in which to perform some computation on the input data may be determined. In particular, for different input data, there may be a clock cycle time that is sufficient for correct computation of a certain percentage of operations. A shorter cycle time may be selected such that a very small percentage of operations in some or all applications are not computed correctly in order to have faster design that later can be converted into a more power-efficient design. Statistical modeling can aid in selecting a cycle time that balances calculation errors against power-efficiency such that no more than a given percentage of operations are incorrectly calculated.

In another embodiment, the design module 206 is configured to perform combination and sequential logic synthesis techniques for designing logic such that a subset of the signal paths has longer timing constraints than a targeted clocking frequency. In particular, the design module 206 may perform retiming, pipelining, and technology mapping. In yet another embodiment, the design module 206 configures physical design operations such as placement of circuit logic and routing of signals between the logic. Placement is a synthesis step where the location of each module and each gate is decided. Routing is a synthesis step that may be employed during the creation of an integrated circuit where the locations of interconnecting wires between circuits may be decided. In state-of-the-art synthesis approaches, routing may be divided into two phases: global routing and local routing. Global routing determines which area of the integrated circuit is used for signal wiring. Local routing (also known as channel assignment) determines where a wire that connects two or more gates, circuits, transistors, capacitors, resistors will be exactly placed.

According to embodiments, the manufacturing module 208 selects and configures manufacturing operations based on a cost-benefit analysis considering quantitative tradeoffs between accuracy and energy consumption when one or more manufacturing errors are allowed during the manufacturing stage 102B. In some embodiments, a manufacturing error may refer to manufacturing variability. In other embodiments, manufacturing error may also refer to manufacturing priorities based on a tradeoff between accuracy and energy consumption. The manufacturing module 208 may utilize a variety of testing and analysis methodologies to determine the relevant benefits and costs associated with allowing an error.

According to embodiments, the implementation module 210 selects and configures implementation operations based on a cost-benefit analysis considering quantitative tradeoffs between accuracy and energy consumption when one or more implementation errors are allowed. The implementation module 210 may utilize a variety of testing and analysis methodologies to determine the relevant benefits and costs associated with allowing an error during the implementation stage 102C. The implementation module 210 may consider a variety of implementation operations including, but not limited to, gate sizing, intentional tolerance of at least a subset of interconnect crosstalk situations, intentional tolerance to at least a subset of power grid imperfections, timing closure operations, and mask design operations.

Gate sizing refers to the process where the physical dimensions of each gate, such as the widths and/or lengths of the conduction channels in transistors, are set to a specified value such that a particular objective (e.g., power, speed, cost associated with the die area) are optimized. During gate sizing, the transistors are altered by the same multiplicative factor with respect to a nominal library value. If the transistors that form a gate are sized so that their ratios are not preserved, the synthesis step is referred to as transistor sizing. Also, each interconnect can be sized by adjusting its width so that an objective is optimized.

Intentional tolerance refers to an act of knowingly accepting a particular error (e.g., variance) in the pertinent design because the error's impact on the correctness is low and/or rare and further because the error is beneficial for power, speed, or other objective. Power grid imperfections refer to errors in voltage supply and ground network on an integrated circuit that result in excessively high voltage noise in rare instances. Interconnect crosstalk refers to a phenomenon where one or more close interconnects impact the signal in such a way that the correct signal is suppressed and altered or that a fake incorrect signal is generated.

Timing closure refers to a synthesis and analysis procedure, where the goal is to identify modules or gates that have to be altered in such a way that the overall clock delay is reduced to a target delay. In addition, a re-synthesis step may be performed to accomplish the delay reduction.

Mask design refers to a process of generating masks used in a photo-lithography process to create transistors, interconnects, and other entities of an integrated circuits (e.g., a fill-up, which is described below). The surface of the semiconductor wafer is often coated with a photo-resistive material that reacts to the exposure of light. The mask either prevents or permits the impact of light on the coated surface. Consequently, chemicals and/or other semiconductor processing techniques are used to remove material from the exposed parts of the wafer so that transistors (e.g., drain, source) and other components may be created.

According to embodiments, the instruction creation module 212 creates instructions executable by the computational system to detect and/or to correct or prevent the allowed computational and other errors. As previously described, an error may be allowed if it has a relatively low impact on overall performance. The error may naturally have a low impact or the impact may be reduced by executing the instructions created by the instruction creation module 212.

According to embodiments, the process selection module 214 selects processes that optimize tradeoffs between accuracy and energy consumption when one or more process and other errors are allowed. The process selection module 214 may select suitable processes from a group of conventional processes capable of resolving one or more relevant task. An example of such a group of processes is a group of digital filters including Fast Fourier Transform ("FFT") filters, Discrete Cosine Transform ("DCT") filters, Finite Impulse Response ("FIR") filters, Infinite Impulse response ("IIR") filters, and the like. These filters may produce the same results from the same inputs; however, each filter may perform different operations and may have different sensitivities to errors. For example, for the same specified filter, an FIR filter may require more operations than a corresponding IIR filter. However, FIR filters are generally resilient to errors as compared to IIR filters, which are generally sensitive to computational and other errors. Another example of a group of processes is a group of sorting processes including bubble sort, insert sort, radix sort, merge sort, and the like. The process selection module 214 may utilized by the design module 206 to design and/or the implementation module 210 to implement processes executed on the computational system.

According to other embodiments, the compilation module 216 optimizes computer program compilation in way that facilitates tradeoffs between accuracy and energy consumption when one or more compilation and other errors are allowed. Generally, a compiler transforms higher-level computer program into a lower-level representation more suitable for execution by a computational system. The compilation module 216 may consider a program transformation that impacts word-length requirements and numerical stability. Further, heuristic and statistical techniques may be utilized to guide which transformations are applied and in which order the transformations are applied.

According to still other embodiments, the error correction and prevention module 218 can be configured to detect, as well as to correct or prevent allowed errors, while the computational system is executing the computer program. The error correction and prevention module 218 may utilize any of a variety of error detection and error correction and prevention techniques, as contemplated by those skilled in the art. Furthermore, the error correction and prevention module 218 may receive instructions created by the instruction creation module 212 to enable error detection and error correct and prevention. The operation of the error correction and prevention module 218 may be triggered when specific errors are detected.

Figure 3:
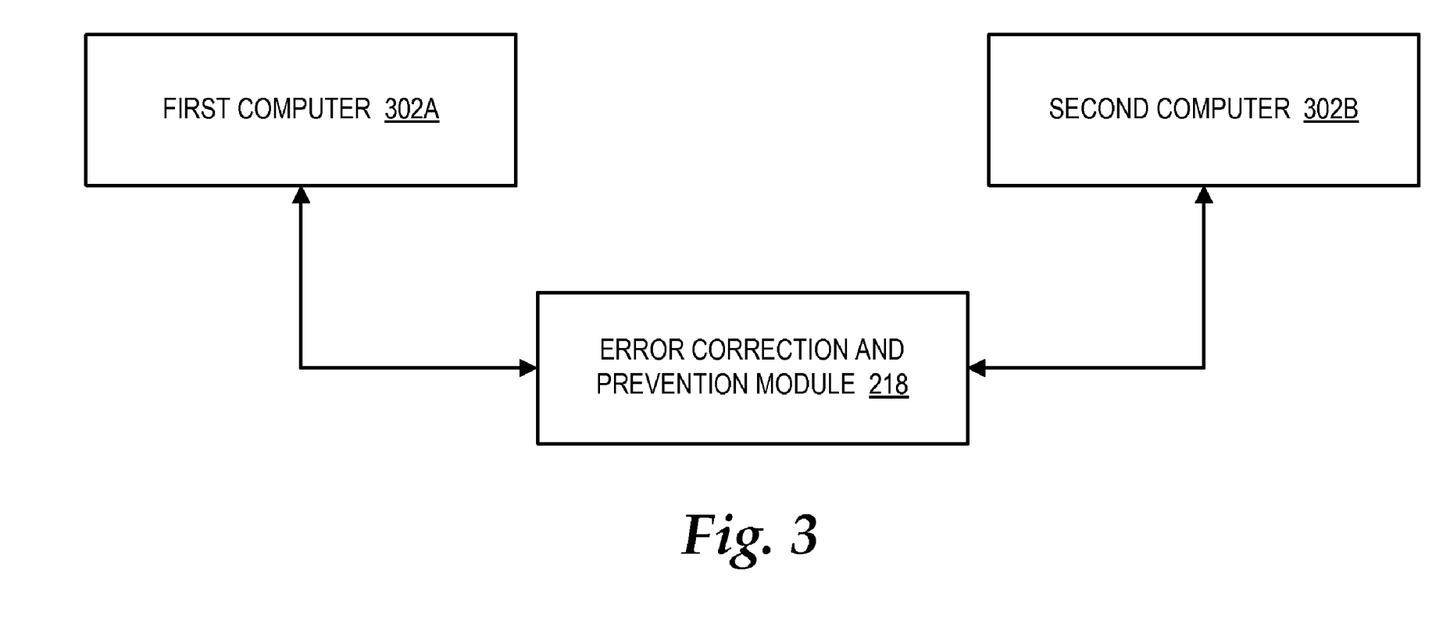
FIG. 3 is a block diagram illustrating an implementation of an error correction and prevention module, in accordance with some embodiments of the present disclosure.

FIG. 3 is a block diagram illustrating an implementation of the error correction and prevention module 218, in accordance with some embodiments of the present disclosure. As illustrated in FIG. 3, in some embodiments, the error correction and prevention module 218 detects errors by comparing the results of a given computation on a first computational system 302A with the results of a second computational system 302B that is the same as or is functionally equivalent to the first computational system 302A. In another embodiment, the error correction and prevention module 218 diagnoses errors by tracing discrepancies between the design of the first computational system 302A that experiences an error and the design of the second computational system 302B that does not experience the error. The error correction and prevention module 218 may detect errors using various modeling techniques (e.g., simulation, emulation) or through actual execution of the computational systems 302A, 302B.

In some embodiments, the error correction and prevention module 218 implements special-purpose circuitry that corrects results when specific conditions are met. In another embodiment, the error correction and prevention module 218 alternates a subset of inputs in a computer program. In another embodiment, the error correction and prevention module 218 alternates a subset of intermediate variables in a computer program. In another embodiment, the error correction and prevention module 218 alternates a subset of instructions in a computer program. These alternations may be static or dynamic.

In another embodiment, the error correction and prevention module 218 coordinates execution of a computer program on two or more computational systems, such as the computational systems 302A, 302B. In this case, energy consumption at the first computational system 302A is minimized using intentional error introduction, while the second computational system 302B corrects errors in the computer program. Alternatively, energy consumption at the first computational system 302A is minimized using intentional error introduction, while the second computational system 302B corrects errors in the data utilized by a computer program. In another embodiment, the error correction and prevention module 218 is configured to correct errors through a statistical analysis of inputs.

Referring again to FIG. 2, according to embodiments, the system analysis module 220 can be configured to select which errors to allow (e.g., errors that are not corrected) based on the cost-benefit analysis and to analyze the operations of the design module 206, the manufacturing module 208, the implementation module 210, and other relevant modules to estimate the accuracy and the energy consumption of the computational system. The system analysis module 220 may verify the results of the error correction and prevention module 218 by performing one of the following three functions: simulation, emulation, or actual execution. In particular, the system analysis module 220 may verify that the allowed errors have been corrected to a satisfactory level that minimizes any negative impact of the allowed error.

Simulation analyzes the behavior of designed hardware specified in high-level language using a program that is executed on a suitable computing system (e.g., a personal computer ("PC") or a farm of multiple PCs). Emulation analyzes the behavior of designed hardware specified in high-level language using a program that is executed on a specially built reconfigurable hardware (e.g., field-programmable gate arrays ("FPGAs")). Simulation provides greater convenience of use, reduced cost, and faster development time over emulation. However, emulation provides a much higher speed of execution.

According to embodiments, the performance validation module 222 can be configured to validate the estimated accuracy and the estimated energy consumption during actual execution of the computer program on the computational system. In particular, the performance validation module 222 may compare the actual accuracy and the actual energy consumption of the operation of the computational system to the estimated accuracy and the estimated energy consumption in order to verify the previous estimates.

An illustrative example applying the cost-benefit module 106 will now be described. By way of example and not limitation, a very small bi-quadratic IIR filter can be instantiated in the following manner:

$s1 = \text{In} + c1*s1@1 + c2*s2@1$ $s2 = s1@1$ $\text{Out} = s1 + c3*s1@1 + c4*s2@2$ An Nth order IIR filter is given by the following:

$$Y_t = \sum_{i=0}^{N} a_i X_{t-i} - \sum_{i=1}^{N} b_i Y_{t-i}$$

Furthermore, the relationship between output and input for an IIR biquad can be identified by the following. It should be appreciated that multiple representations of IIR are known to those skilled in the art, and these other representations may be similarly utilized.

$Y_t = a_0 X_t + a_1 X_{t-1} + a_2 X_{t-2} + B_1 Y_{t-1} + B_2 Y_{t-2}$

The operational semantic is synchronous data flow. That is, the computations are continuously executed, and at every fourth cycle, a new input In is received which results in a new output Out and two states, s1 and s2. The sign s1@1 indicates the value of s, which is produced in previous iterations. In this case, the variable "@" is used to replace the relevant subscript, such as X and Y or In and Out. For example, in an equation containing t-1, t-2, . . . t-k, the subscript t may be replaced by @. Thus, t-1 becomes @1, t-2 becomes @2, and so on to where t-k becomes @k. The results of the first three iterations of the computations are as follows.

$s11 = \text{In}1 + c1*s10 + c2 + s20$ $s21 = s10$ $\text{Out}1 = s11 + c3 + s10 + c4*s20$ $s12 = \text{In}2 + c1*s11 + c2*s21$ $s22 = s11$ $\text{Out}2 = s11 + c3*s11 + c4*s21$ $s13 = \text{In}3 + c1*s12 + c2*s22$ $s23 = s12$ $Out3 = s11 + c3*s12 + c4*s22$ In an illustrative example, the computational tasks analysis module 202 may identify that the computations involve four multiplications with constants and four additions. The computational tasks analysis module 202 may also conclude that errors in computing multiplications with c3 and c4 are easier to correct and tolerate because these errors impact only the output. The other two multiplications are considered more detrimental because they may impact all future outputs. Thus, if c1 and c2 are small, the computational tasks analysis module 202 can intentionally introduce short cycle times even though two other multiplications often will be incorrectly calculated. These errors are generally easy to detect and correct. Furthermore, these errors can save a significant amount of energy because the multipliers typically consume much more energy than additions.

The data analysis module 204 may observe and determine that as long as the values for the inputs and states are small, faster multipliers than indicated by a worst case analysis can be utilized in order to save energy. Alternatively, the data analysis module 204 may observe and determine that when In has a very low value, the iteration can be skipped and the output, the input, and the states can be corrected in the next iteration.

The design module 206 may create multipliers or adders that are too slow for the target cycle time. In particular, the design module 206 may calculate the probability of errors, the cost of correcting the errors, and intentionally design some combinational paths in the adders and multipliers to be very slow in order to increase energy efficiency. The implementation module 210 may size gates on these paths to be very slow and very energy efficient. Alternatively, the implementation module 210 may utilize a low power slow gate library for the gates on these paths. The manufacturing module 208 may place fill-ups close to these gates. Alternatively, the manufacturing module 208 may not execute some of the optical correction operations on these gates or allow crosstalk on the interconnects that connect these gates.

During fabrication, an integrated circuit may be subject to chemical-mechanical polishing ("CMP"). However, some areas have more metal (e.g., the interconnect) while others have less metal. In this regard, CMP removes more material at the areas having less metal (i.e., the softer areas). In order to avoid this unwanted effect, small patterns (e.g., squares) of metal can be added at some areas to increase the uniformity of metal distribution and thereby increase the effectiveness of CMP. This process is referred to as a "fill-up".

The instruction creation module 212 may inform users, the operating system, and/or the compiler which errors are allowed and further provide code for detecting and correcting these errors. The process selection module 214 may analyze a variety of filter structures in terms of their energy costs and their suitability for reducing energy costs by allowing various sets of errors. For example, the process selection module 214 may select a FIR filter according to such criteria.

The compilation module 216 may target the implementation of the IIR biquad on a programmable processor. For example, the compilation module 216 may schedule operations that require correction early in an iteration in order to reduce allow time for correcting errors in the operations. More specifically, the compilation module 216 may assign slow multipliers and schedule them in the first clock cycle of the iteration. The error correction and prevention module 218 may change the value of a variable so that incorrect calculations of the multiplications with c3 and c4 are corrected. Alternatively, the error correction and prevention module 218 may add an extra adder after the variable Out is calculated in order to correct its value for specific values of variables s1, s2, and In.

The system analysis module 220 may select a specific set of allowed errors, architecture, implementation, and corrections and based on these selections, analyze the system in terms of energy consumption and correctness. The performance validation module 222 may then apply new inputs and determine actual energy savings.

Figure 4:
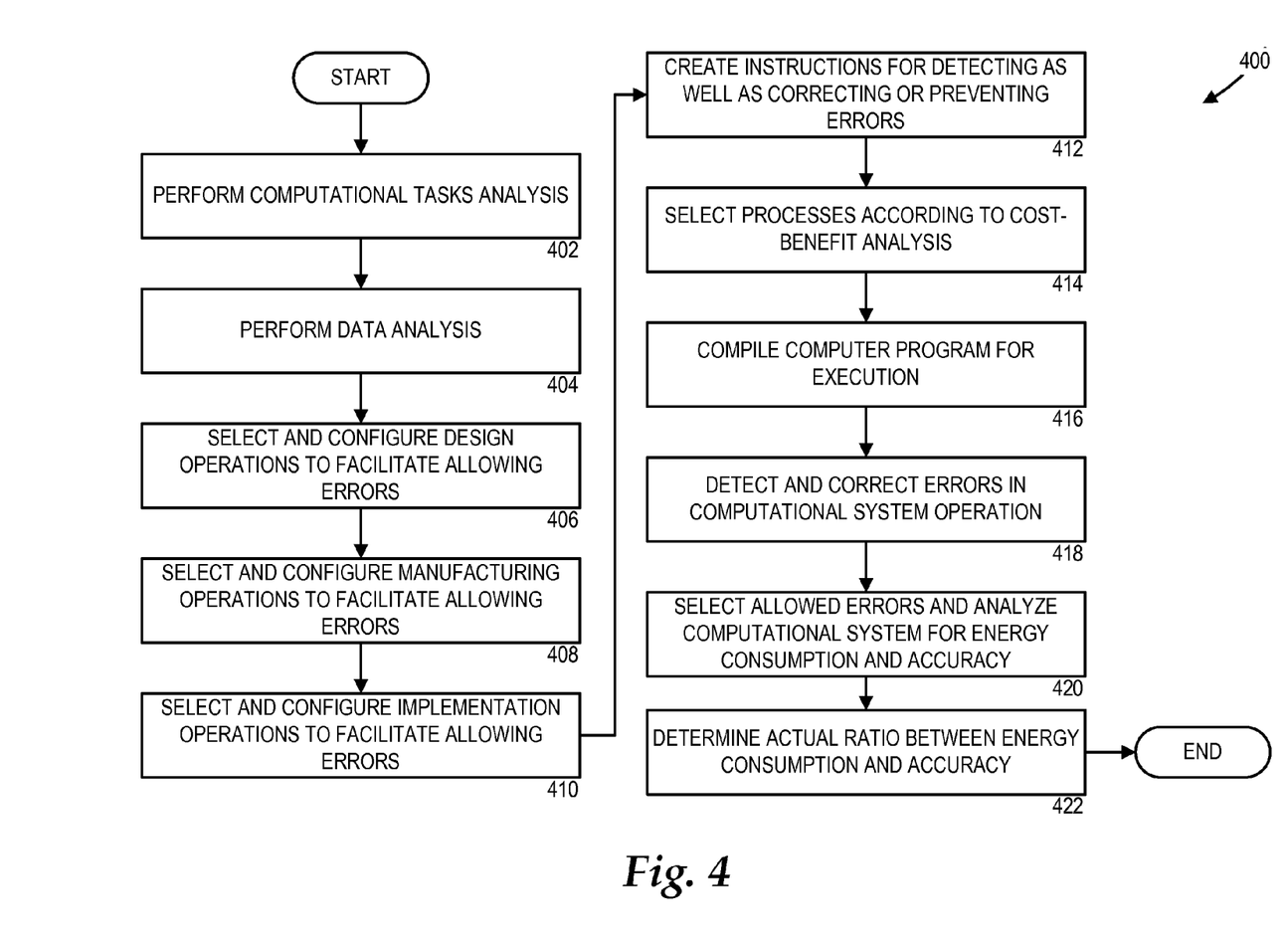
FIG. 4 is a flow diagram showing an illustrative process for intentionally allowing errors in the computational system to optimize energy consumption of the computational system, in accordance with some embodiments.

FIG. 4 is a flow diagram showing an illustrative process for intentionally allowing errors in the computational system to optimize energy consumption of the computational system, in accordance with some embodiments. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

The routine 400 begins at operation 402, where the computational tasks analysis module 202 is configured to perform a computational tasks analysis. Computational tasks analysis refers to analyzing a computer program to determine operations performed when the computational system executes the computer program, errors in the operations, and impact of the errors between the operations. The routine 400 proceeds to operation 404, where the data analysis module 204 is configured to perform data analysis. Data analysis refers to analyzing the behavior of the computer program when executed by the computational system and/or the computational system itself based on a given set of inputs.

The routine 400 proceeds to operation 406, where the design module 206 selects and configures design operations to facilitate allowing certain errors in the computational system when designing the computational system. In particular, the design module 206 may select and configure design operations based on information provided from the computational tasks analysis module 202 and the data analysis module 204. The routine 400 proceeds to operation 408, where the manufacturing module 208 selects and configures manufacturing operations to facilitate allowing certain errors in the computational system when manufacturing the computational system. Like the design module 206, the manufacturing module 208 may select and configure manufacturing operations based on information provided from the computational tasks analysis module 202 and the data analysis module 204. The routine 400 proceeds to operation 410, where the implementation module 210 selects and configures implementation operations to facilitate allowing certain errors in the computational system when implementing the computational system. Like the design module 206 and the manufacturing module 208, the implementation module 210 may select and configure implementation operations based on information provided from the computational tasks analysis module 202 and the data analysis module 204.

The routine 400 proceeds to operation 412, where the instruction creation module 212 creates instructions, such as computer program instructions, operative to detect as well as to correct or prevent errors. In particular, the instruction creation module 212 may create instructions for detecting as well as correcting or preventing the allowed errors. These instructions may be provided to the error correction and prevention module 218. The routine 400 proceeds to operation 414, where the process selection module 214 selects suitable processes from groups of processes according to a cost-benefit analysis.

The routine 400 proceeds to operation 416, where the compilation module 216 is configured to compile the computer program for execution by the computational system. In particular, the compilation module compiles the computer program in a way that facilitates allowing certain errors in the computational system. The routine 400 proceeds to operation 418, where the error correction and prevention module 218 detects and corrects errors in the computational system operation by executing the instructions created by the instruction creation module 212. The routine 400 proceeds to operation 420, where the system analysis module 220 selects the allowed errors and analyzes the computational system for energy consumption and accuracy according to the allowed errors. Multiple sets of allowed errors may be utilized in order to determine an optimal ratio between energy consumption and accuracy. The routine 400 proceeds to operation 422, where the performance validation module 222 determines the actual ratio between energy consumption and accuracy through the implementation of actual inputs.

Figure 5:
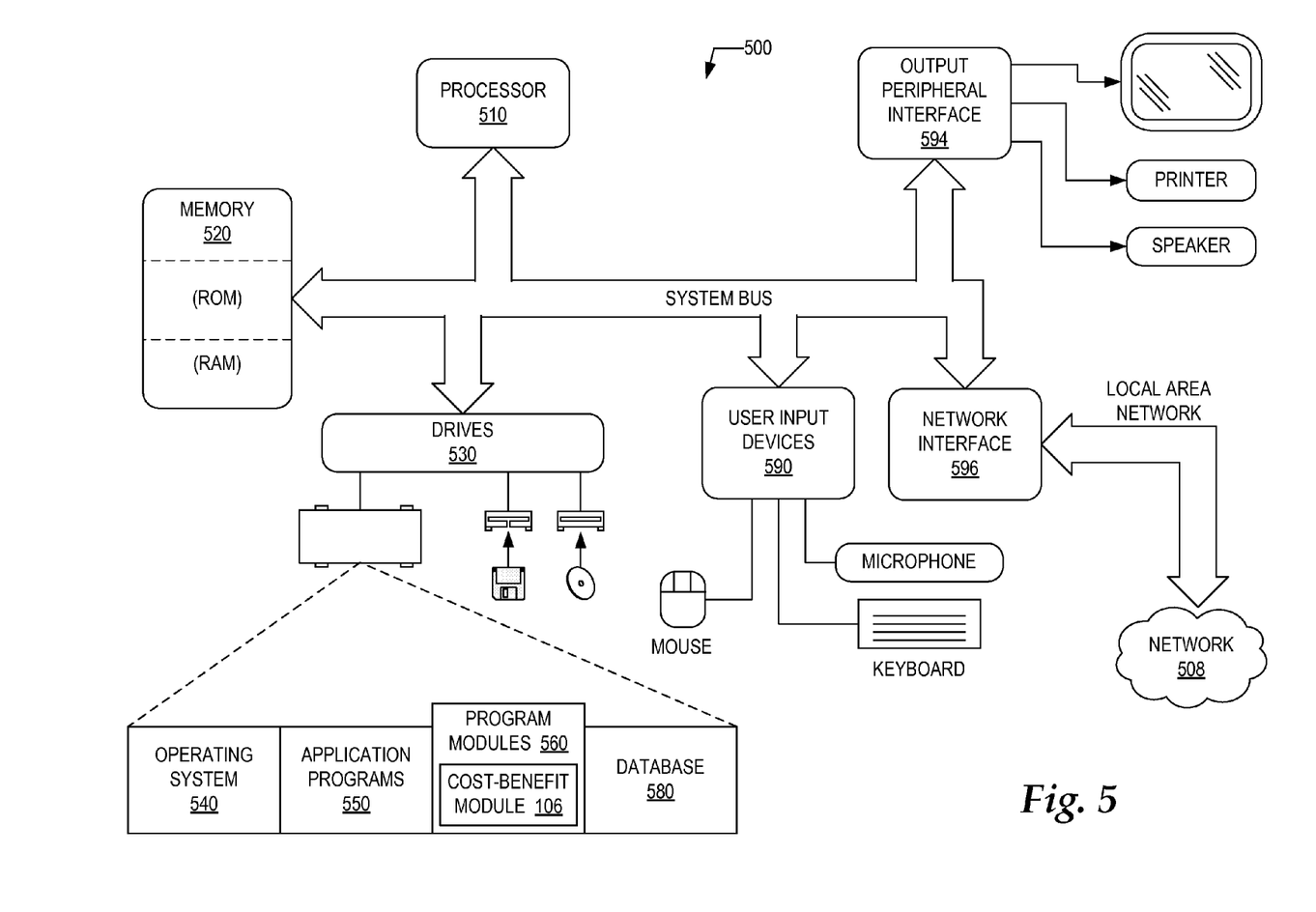
FIG. 5 is a computer architecture diagram showing an illustrative computer hardware architecture for a computing system capable of implementing the embodiments presented herein.

FIG. 5 is a computer architecture diagram showing an illustrative computer hardware architecture for a computing system capable of implementing the embodiments presented herein. FIG. 5 includes a computer 500, including a processor 510, memory 520 and one or more drives 530. The drives 530 and their associated computer storage media, provide storage of computer readable instructions, data structures, program modules and other data for the computer 500. The drives 530 can include an operating system 540, application programs 550, program modules 560, and a database 580. The computer 500 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to a processor 510 through a user input interface that is coupled to a system bus, but may be connected by other interface and bus structures, such as a parallel port, game port or a universal serial bus ("USB"). Computers such as the computer 500 may also include other peripheral output devices such as speakers, which may be connected through an output peripheral interface 594 or the like.

The computer 500 may operate in a networked environment using logical connections to one or more computers, such as a remote computer connected to a network interface 596. The remote computer may be a personal computer, a server, a router, a network PC, a peer device or other common network node, and can include many or all of the elements described above relative to the computer 500. Networking environments are commonplace in offices, enterprise-wide area networks ("WAN"), local area networks ("LAN"), intranets and the Internet. For example, in the subject matter of the present application, the computer 500 may comprise the source machine from which data is being migrated, and the remote computer may comprise the destination machine or vice versa. Note however, that source and destination machines need not be connected by a network 508 or any other means, but instead, data may be migrated via any media capable of being written by the source platform and read by the destination platform or platforms. When used in a LAN or WLAN networking environment, the computer 500 is connected to the LAN through the network interface 596 or an adapter. When used in a WAN networking environment, the computer 500 typically includes a modem or other means for establishing communications over the WAN, such as the Internet or the network 508. It will be appreciated that other means of establishing a communications link between the computers may be used.

According to some embodiments, the computer 500 is connected in a networking environment such that the processor 510 and/or the program modules 560 can perform with or as the cost-benefit module 106 to provide energy optimization by intentionally allowing errors, in accordance with embodiments herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for intentionally allowing errors in a computational system to optimize energy consumption of the computational system, the method comprising:
    performing a cost-benefit analysis to identify one or more allowable errors and one or more non-allowable errors in the computational system, the allowable errors being identified by the cost-benefit analysis as being acceptable errors for optimizing energy consumption with respect to accuracy of the computational system, the non-allowable errors being identified by the cost-benefit analysis as being unacceptable errors for optimizing energy consumption with respect to accuracy of the computational system; and
    transforming the computational system from a first state in which the computational system corrects or prevents the allowable errors and the non-allowable errors into a second state in which the computational system allows the allowable errors and corrects or prevents the non-allowable errors.

2. The computer-implemented method of claim 1, wherein performing the cost-benefit analysis to identify one or more allowable errors comprises:
    determining a quantitative cost of reduced accuracy of the computational system associated with allowing a given error;
    determining a quantitative benefit of reduced energy consumption associated with allowing the given error;
    determining whether the quantitative benefit exceeds the quantitative cost by a threshold;
    responsive to determining that the quantitative benefit exceeds the quantitative cost by the threshold, identifying the given error as one of the allowable errors; and
    responsive to determining that the quantitative benefit does not exceed the quantitative cost by the threshold, identifying the given error as one of the non-allowable errors.

3. The computer-implemented method of claim 1, wherein transforming the computational system from a first state in which the computational system corrects or prevents the allowable errors and the non-allowable errors into a second state in which the computational system allows the allowable errors and corrects or prevents the non-allowable errors comprises configuring design operations of the computational system in a way to allow the allowable errors in the computational system.

4. The computer-implemented method of claim 3, wherein transforming the computational system from a first state in which the computational system corrects or prevents the allowable errors and the non-allowable errors into a second state in which the computational system allows the allowable errors and corrects or prevents the non-allowable errors comprises configuring design operations of the computational system in a way to correct or prevent the non-allowable errors in the computational system.

5. The computer-implemented method of claim 1, wherein transforming the computational system from a first state in which the computational system corrects or prevents the allowable errors and the non-allowable errors into a second state in which the computational system allows the allowable errors and corrects or prevents the non-allowable errors comprises configuring manufacturing operations of the computational system in a way to allow the allowable errors in the computational system.

6. The computer-implemented method of claim 5, wherein transforming the computational system from a first state in which the computational system corrects or prevents the allowable errors and the non-allowable errors into a second state in which the computational system allows the allowable errors and corrects or prevents the non-allowable errors comprises configuring manufacturing operations of the computational system in a way to correct or prevent the non-allowable errors in the computational system.

7. The computer-implemented method of claim 1, wherein transforming the computational system from a first state in which the computational system corrects or prevents the allowable errors and the non-allowable errors into a second state in which the computational system allows the allowable errors and corrects or prevents the non-allowable errors comprises implementing the computational system in a way to intentionally allow the allowable errors in the computational system.

8. The computer-implemented method of claim 7, wherein transforming the computational system from a first state in which the computational system corrects or prevents the allowable errors and the non-allowable errors into a second state in which the computational system allows the allowable errors and corrects or prevents the non-allowable errors comprises implementing the computational system in a way to correct or prevent the non-allowable errors in the computational system.

9. The computer-implemented method of claim 1, the method further comprising:
receiving instructions for detecting the allowable errors;
receiving instructions for correcting or preventing the allowable errors;
executing the instructions for detecting the allowable errors while executing the computational system to detect the allowable errors; and
responsive to detecting the allowable errors, executing the instructions for correcting the allowable errors while executing the computational system to correct or prevent the allowable errors.

10. The computer-implemented method of claim 1, the method further comprising modifying compiler operations on a computer program executed on the computational system, the modified compiler operations adapted to compile the computer program in a way that facilitates the computational system intentionally allowing the allowable errors or correcting or preventing the non-allowable errors in the computational system.

11. A computer-readable medium having instructions stored thereon for execution by a processor to provide a method for intentionally allowing errors in a computational system to optimize energy consumption of the computational system, the computer-readable medium comprising instructions configured for:
determining a quantitative cost associated with allowing a given error in the computational system, the quantitative cost comprising a measure of a loss of accuracy of the computational system resulting from allowing the given error;
determining a quantitative benefit associated with allowing the given error in the computational system, the quantitative benefit comprising a measure of energy savings of the computational system resulting from allowing the given error;
determining whether the quantitative benefit exceeds the quantitative cost by a threshold;
responsive to determining that the quantitative benefit exceeds the quantitative cost by the threshold, identifying the given error as an allowable error;
responsive to determining that the quantitative benefit does not exceed the quantitative cost by the threshold, identifying the given error as a non-allowable error; and
selecting and configuring design operations for allowing the allowable error in the computational system and correcting or preventing the non-allowable error with respect to designing the computational system.

12. The computer-readable medium of claim 11, further comprising instructions configured for selecting manufacture operations with respect to allowing the allowable error in the computational system and correcting or preventing the non-allowable error in the computational system with respect to manufacturing the computational system.

13. The computer-readable medium of claim 11, further comprising instructions configured for selecting and configuring implementation operations with respect to allowing the allowable error in the computational system and correcting or preventing the non-allowable error in the computational system with respect to implementing the computational system.

14. The computer-readable medium of claim 11, wherein determining a quantitative cost associated with allowing a given error in the computational system comprises estimating the loss of accuracy through a simulation of the computational system as designed; and wherein determining a quantitative benefit associated with allowing the given error in the computational system comprises estimating the energy savings through the simulation of the computational system as designed.

15. The computer-readable medium of claim 11, further comprising instructions configured for:
executing a given set of inputs on the computational system as designed;
measuring an actual loss of accuracy and an actual energy savings associated with executing the given set of inputs on the computational system; and
validating the computational system as designed by comparing the actual loss of accuracy and the actual energy savings to an estimated loss of accuracy and an estimated energy savings.

16. A system operative to intentionally allow errors in a computational system to optimize energy consumption of the computational system, the system comprising:
a design module operative to select and configure design operations to facilitate allowing an allowable error in the computational system;
a manufacturing module operative to select and configure manufacturing operations to facilitate allowing the allowable error in the computational system;
an implementation module operative to select and configure implementation operations to facilitate allowing the allowable error in the computational system;
an error correction and prevention module operative to correct or prevent the allowable error while the computational system is executing a computer program;
a system analysis module operative to select the allowable error and to analyze the operations of the design module, the manufacturing module, the implementation module to estimate an accuracy and an energy consumption of the computational system; and
a performance validation module operative to validate the estimated accuracy and the estimated energy consumption during actual execution of the computer program on the computational system.

17. The system of claim 16, further comprising:
a computational tasks analysis module operative to perform a computational tasks analysis analyzing the computer program to determine operations performed when the computational system executes the computer program, errors in the operations, and impact of the errors between the operations; and a data analysis module operative to perform a data analysis analyzing behavior of the computer program when executed by the computational system and the computational system based on a given set of inputs;

wherein the computational tasks analysis and the data analysis are provided to the design module to select and configure the design operations, to the manufacturing module to select and configure the manufacturing operations, and to the implementation module to select and configure the implementation operations.

18. The system of claim 16, further comprising a process selection module operative to select, from a group of processes, a process that optimizes energy consumption with respect to the computational system allowing the allowable error.

19. The system of claim 16, further comprising a compilation module operative to compile the computer program for execution by the computational system, the compilation module further operative to compile the computer program in a way that facilitates allowing the allowable error in the computational system.

20. The system of claim 16, further comprising an instruction creation module operative to provide instructions executable by the computational system to correct or prevent the allowable error, the instructions being provided to the error correction and prevention module to correct or prevent the allowable error.

* * * * *